(12) United States Patent
Liu

(10) Patent No.: US 10,868,687 B2
(45) Date of Patent: Dec. 15, 2020

(54) SERVICE DELIVERY METHOD, DEVICE AND SYSTEM, AND STORAGE MEDIUM

(71) Applicant: ZTE CORPORATION, Guangdong (CN)

(72) Inventor: Feng Liu, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/478,237

(22) PCT Filed: Jan. 16, 2018

(86) PCT No.: PCT/CN2018/072873
§ 371 (c)(1),
(2) Date: Jul. 16, 2019

(87) PCT Pub. No.: WO2018/130228
PCT Pub. Date: Jul. 19, 2018

(65) Prior Publication Data
US 2019/0356501 A1  Nov. 21, 2019

(30) Foreign Application Priority Data
Jan. 16, 2017  (CN) .......................... 2017 1 0032825

(51) Int. Cl.
*H04L 12/28* (2006.01)
*H04L 12/927* (2013.01)
(Continued)

(52) U.S. Cl.
CPC ........... *H04L 12/28* (2013.01); *G08G 1/0125* (2013.01); *H04L 47/10* (2013.01); *H04L 47/20* (2013.01);
(Continued)

(58) Field of Classification Search
CPC ...... H04L 47/2441; H04L 47/10; H04L 47/20
See application file for complete search history.

(56) References Cited

U.S. PATENT DOCUMENTS 7,143,439 B2 * 11/2006 Cooper ............... H04L 41/0609
726/11
7,773,549 B2 * 8/2010 Shin .................... H04L 12/1877
370/312
(Continued)

FOREIGN PATENT DOCUMENTS

CN   103840904 A   6/2014
CN   103875205 A   6/2014
(Continued)

OTHER PUBLICATIONS

International Search Report and Written Opinion for International Appl. No. PCT/CN2018/072873, dated Apr. 19, 2018.
(Continued)

*Primary Examiner* — Raj Jain
(74) *Attorney, Agent, or Firm* — Foley & Lardner LLP

(57) ABSTRACT

Disclosed are a traffic delivery method, apparatus and system, and a relevant computer storage medium. The method may include: determining the number of traffic flows according to a traffic bandwidth of a traffic to be transmitted; grouping the traffic flows of the traffic to be transmitted according to the number of the traffic flows and a preset grouping policy to obtain a plurality of traffic groups of the traffic to be transmitted; where the number of the traffic groups is equal to the number of physical layer (PHY) transport channels; and determining a PHY transport channel corresponding to each of the traffic groups of the traffic to be transmitted according to a matching relationship between traffic bandwidths of the traffic groups and transmission rates of the PHY transport channels, and sending the each of the traffic groups of the traffic to be transmitted
(Continued)

through the PHY transport channel corresponding to the each of the traffic groups of the traffic to be transmitted.

13 Claims, 10 Drawing Sheets

(51) Int. Cl.
*H04W 92/02* (2009.01)
*H04L 12/813* (2013.01)
*G08G 1/01* (2006.01)
*H04L 12/851* (2013.01)
*H04L 12/801* (2013.01)

(52) U.S. Cl.
CPC ........ *H04L 47/2441* (2013.01); *H04L 47/803* (2013.01); *H04W 92/02* (2013.01)

(56) References Cited

U.S. PATENT DOCUMENTS

| | | | | |
|---|---|---|---|---|
| 7,917,647 | B2* | 3/2011 | Cooper | H04L 43/00 709/233 |
| 10,530,846 | B2* | 1/2020 | Jung | H04L 67/1004 |
| 2004/0081093 | A1* | 4/2004 | Haddock | H04L 47/10 370/230 |
| 2013/0268628 | A1* | 10/2013 | Zhu | H04W 72/042 709/217 |
| 2015/0055664 | A1 | 2/2015 | Kanonakis et al. | |
| 2016/0197743 | A1* | 7/2016 | Su | H04L 41/0226 370/401 |
| 2016/0295624 | A1* | 10/2016 | Novlan | H04W 72/04 |
| 2018/0255507 | A1* | 9/2018 | Nagasaka | H04W 36/0061 |
| 2019/0356501 | A1* | 11/2019 | Liu | H04J 3/1658 |

FOREIGN PATENT DOCUMENTS

| | | |
|---|---|---|
| CN | 103997387 A | 8/2014 |
| CN | 103997388 A | 8/2014 |
| CN | 103997426 A | 8/2014 |

OTHER PUBLICATIONS

Alcatel-Lucent USA: "Thoughts on FlexE Partial-rate Mappings" wd, ITU-T Draft; Study Period 2013-2016, International Telecommunication Union, Geneva, CH, vol. 11/15, Oct. 5, 2015 (Oct. 5, 2015), pp. 1-7, XP044148142, [retrieved on Oct. 5, 2015].

Extended European Search Report for EP Appl. No. 18739205.5, dated Sep. 8, 2020.

Huang J, et al: "Framework and Requirements for GMPLS-based Control of Flexible Ethernet Network"; draft-huang-flexe-framework, Framework and Requirements for GMPLS-Based Control of Flexible Ethernet Network; draft-huang-flexe-framework-00.txt, Internet Engineering Task Force, IETF; Standardworkingdraft, Internet Society (ISOC) 4, Rue Des Falaises CH-1205 Geneva, Switzerland, Sep. 1, 2016 (Sep. 1, 2016), pp. 1-19, XP015115079, [retrieved on Sep. 1, 2016].

Huawei Technologies Co., et al: "Considerations on the mapping of FlexE Client and Subrate signals into OTN"; C 119511, ITU-T Draft; Study Period 2013-2016, International Telecommunication Union, Geneva, CH, vol. 11/15, Jun. 8, 2015 (Jun. 8, 2015), pp. 1-13, XP044136869, [retrieved on Jun. 8, 2015].

Huawei Technologies Co., et al: "FlexE aware mapping method 6B text proposal"; C 1670 R2, ITU-T Draft ; Study Period 2013-2016, International Telecommunication Union, Geneva, CH, vol. 11/15, Feb. 2, 2016 (Feb. 2, 2016), pp. 1-7, XP044166081, [retrieved on Feb. 2, 2016].

OIF: "Flex Ethernet Implementation Agreement", IA# 0IF-FlexE-01.0, Mar. 1, 2016 (Mar. 1, 2016), pp. 1-31, XP055459137, retrieved from the Internet: URL:http://www.oiforum.com/wp-content/uploads/OIF-FLEXE-01.0.pdf [retrieved on Mar. 14, 2018].

* cited by examiner

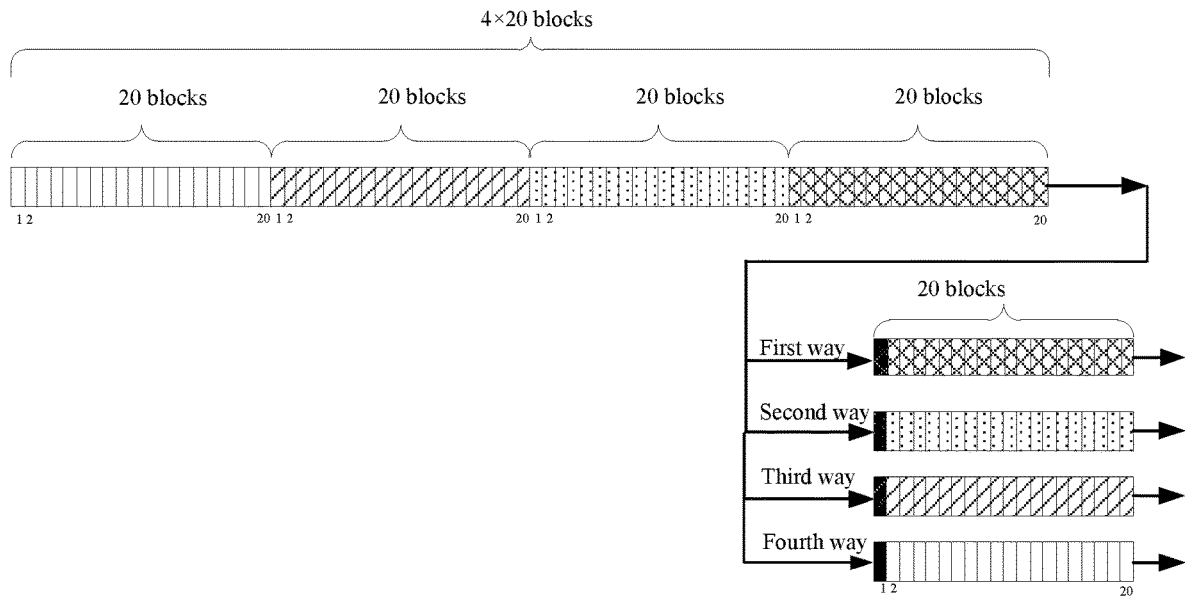

FIG. 3

| 0 | 1 | | 1 2 3 4 | | | | | | | 63 | 64 65 |
|---|---|---|---|---|---|---|---|---|---|---|---|
| 1 | 0 | | 0x4B | C | OMF | RPF | RES | Flexe group number | 0X5 | 0X000_0000 | |
| 0 | 1 | C | PHY MAP | | | PHY number | | | | reserved | |
| 0 | 1 | C | Client calendar A | | | | Client calendar B | | CR | CA | reserved | CRC-16 |
| s | s | | Manage channel-section | | | | | | | | |
| s | s | | | | | | | | | | |
| s | s | | Manage channel-shim to shim | | | | | | | | |
| s | s | | | | | | | | | | |
| s | s | | | | | | | | | | | reserved: reserved bit
C: a bit indicating adjustment control
OMF: a bit indicating an overhead frame multiframe
RPF: a bit indicating a remote defect
Flexe group number: bits indicating the number of the bundle group Client calendar
Manage channel-section
Manage channel-shim to shim
PHY MAP: a physical layer mapping table
PHY number: physical layer member number

FIG. 4

SERVICE DELIVERY METHOD, DEVICE AND SYSTEM, AND STORAGE MEDIUM

CROSS-REFERENCE TO RELATED APPLICATIONS

This is a National Stage Application, under 35 U.S.C. 371, of International Patent Application No. PCT/CN2018/072873, filed on Jan. 16, 2018, which claims priority to Chinese Patent Application No. 201710032825.5 filed on Jan. 16, 2017, contents of both of which are incorporated herein by reference in their entireties.

TECHNICAL FIELD

The present disclosure relates to the network communication technology and, in particular, to a traffic delivery method, device and system and a relevant computer storage medium.

BACKGROUND

The rapid development of network technologies and the rapid increase of network information traffic prompt the rapid increase of the delivery bandwidth of communication networks. The interface bandwidth of the communication apparatus has been increased from 10 M (unit: bit/second) to 100 M, and then increased to 1 G and even 10 G. Currently, the interface bandwidth has reached to 100 G, and a large number of 100 G optical modules are provided for commercial use on the market.

At present, 400 G optical modules have been developed. However, a 400 G optical module is more expensive than four 100 G optical modules, resulting in lack of value in commercial use. Therefore, in order to deliver traffic of 400 G on 100 G optical modules, the international standards organization defines the Flexible Ethernet (FlexE) protocol.

The basic content of the FLEXE protocol is to bundle multiple 100 G transport channels to form one delivery channel with a larger bandwidth. As shown in FIG. 1, the FLEXE protocol defines a FlexE shim between the media access control (MAC) layer and the physical coding sublayer (PCS), and the FlexE shim bundles four 100 G physical channels to form a 400 G logical channel, which meets the delivery requirement of 400 G traffic without increasing the cost.

Currently, a physical layer defined by the FLEXE protocol is a 100 G physical channel. For a physical layer (PHY) having a physical channel with a rate being an integer multiple of 100 G, such as a physical layer of 200 G or 400 G, no existing standard or protocol exists to define how to deliver traffic, and no existing method of delivering traffic on mixed physical layers with different rates is disclosed.

SUMMARY

The present disclosure expect to provide a traffic delivery method, device and system and a relevant computer storage medium, to deliver a traffic on a physical channel with a rate of an integer multiple of 100 G or on physical channels with different rates.

In a first aspect, an embodiment of the present disclosure provides a traffic delivery method.

The method is applied to a sending end and includes:
determining a number of traffic flows according to a traffic bandwidth of a traffic to be transmitted;
grouping the traffic flows of the traffic to be transmitted according to the number of the traffic flows and a preset grouping policy to obtain a plurality of traffic groups of the traffic to be transmitted; where a number of the traffic groups is equal to a number of physical layer (PHY) transport channels; and
determining a PHY transport channel corresponding to each of the traffic groups of the traffic to be transmitted according to a matching relationship between traffic bandwidths of the traffic groups and transmission rates of the PHY transport channels, and sending the each of the traffic groups of the traffic to be transmitted through the PHY transport channel corresponding to the each of the traffic groups of the traffic to be transmitted.

In a second aspect, an embodiment of the present disclosure provides a traffic delivery method. The method is applied to a receiving end and includes:
receiving a plurality of traffic groups of a traffic to be transmitted through a plurality of physical layer (PHY) transport channels; where the traffic groups are obtained by a sending end grouping a plurality of traffic flows of the traffic to be transmitted according to a number of the traffic flows and a preset grouping policy;
separating traffic flows in each of the traffic groups of the traffic to be transmitted according to a preset separation policy to obtain separated traffic flows; where the preset separation policy is an inverse process corresponding to the grouping policy; and
recovering, from the separated traffic flows, the traffic flows of the traffic to be transmitted according to a preset recovery policy.

In a third aspect, an embodiment of the present disclosure provides a sending end apparatus. The apparatus includes: a determining module, a grouping module and a sending module.

The determining module is configured to determine a number of traffic flows according to a traffic bandwidth of a traffic to be transmitted.

The grouping module is configured to group the traffic flows of the traffic to be transmitted according to the number of the traffic flows and a preset grouping policy to obtain traffic groups of the traffic to be transmitted; where a number of the traffic groups is equal to a number of physical layer (PHY) transport channels.

The sending module is configured to determine a PHY transport channel corresponding to each of the traffic groups of the traffic to be transmitted according to a matching relationship between traffic bandwidths of the traffic groups and transmission rates of the PHY transport channels, and send the each of the traffic groups of the traffic to be transmitted through the PHY transport channel corresponding to the each of the traffic groups of the traffic to be transmitted.

In a fourth aspect, an embodiment of the present disclosure provides a receiving end apparatus. The apparatus includes: a receiving module, a separation module and a recovery module.

The receiving module is configured to receive a plurality of traffic groups of a traffic to be transmitted through a plurality of physical layer (PHY) transport channels; where the traffic groups are obtained by a sending end grouping a plurality of traffic flows of the traffic to be transmitted according to a number of the traffic flows and a preset grouping policy.

The separation module is configured to separate traffic flows in each of the traffic groups of the traffic to be transmitted according to a preset separation policy to obtain separated traffic flows; where the preset separation policy is an inverse process corresponding to the grouping policy.

The recovery module is configured to recover, from the separated traffic flows, the traffic flows of the traffic to be transmitted according to a preset recovery policy.

In a fifth aspect, an embodiment of the present disclosure provides a traffic delivery system. The system includes a sending end apparatus and a receiving end apparatus.

The sending end apparatus is configured to determine a number of traffic flows according to a traffic bandwidth of a traffic to be transmitted;

group the traffic flows of the traffic to be transmitted according to the number of the traffic flows and a preset grouping policy to obtain a plurality of traffic groups of the traffic to be transmitted; where a number of the traffic groups is equal to a number of physical layer (PHY) transport channels; and determine a PHY transport channel corresponding to each of the traffic groups of the traffic to be transmitted according to a matching relationship between traffic bandwidths of the traffic groups and transmission rates of the PHY transport channels, and send the each of the traffic groups of the traffic to be transmitted through the PHY transport channel corresponding to the each of the traffic groups of the traffic to be transmitted.

The receiving end apparatus is configured to receive a plurality of traffic groups of a traffic to be transmitted through a plurality of physical layer (PHY) transport channels; where the traffic groups are obtained by a sending end grouping a plurality of traffic flows of the traffic to be transmitted according to the number of the traffic flows and the preset grouping policy;

separate traffic flows in each of the traffic groups of the traffic to be transmitted according to a preset separation policy to obtain separated traffic flows; where the preset separation policy is an inverse process corresponding to the grouping policy; and recover, from the separated traffic flows, the traffic flows of the traffic to be transmitted according to a preset recovery policy.

In a sixth aspect, an embodiment of the present disclosure further provides a computer storage medium, which is configured to store computer-executable instructions for executing the foregoing traffic delivery method, applied to the sending end.

In a seventh aspect, an embodiment of the present disclosure further provides a computer storage medium, which is configured to store computer-executable instructions for executing the foregoing traffic delivery method, applied to the receiving end.

The embodiments provide a traffic delivery method, apparatus and system and relevant computer storage media. The traffic flows of the traffic to be transmitted are determined according to a standard bandwidth, are grouped according to the number of PHY transport channels and the transmission rates, and are carried and sent on the PHY transport channels. Therefore, traffic can be delivered on a physical channel with a rate being an integer multiple of 100 G, such as a 200 G or 400 G physical layer, and traffic can be delivered on mixed physical layers with different rates.

BRIEF DESCRIPTION OF DRAWINGS

FIG. 3 is a schematic diagram of data transmission in a FLEXE network structure according to an embodiment of the present disclosure;

FIG. 4 is a structural diagram of an overhead frame according to an embodiment of the present disclosure;

DETAILED DESCRIPTION

In an optical module, a 100 G data packet is 64/66 coded before being sent, that is, 64-bit data is expanded into a 66-bit data block, and the added 2-bit data is located at the head of the 66-bit data block as a start identifier of the 66-bit data block. Then the 100 G data packet is sent out from an optical port in the form of a 66-bit data block. Upon reception, the optical port discriminates the 66-bit data block from the received data flow, then recovers the original 64-bit data from the 66-bit data block and reassembles to obtain the data packet.

Figure 1:
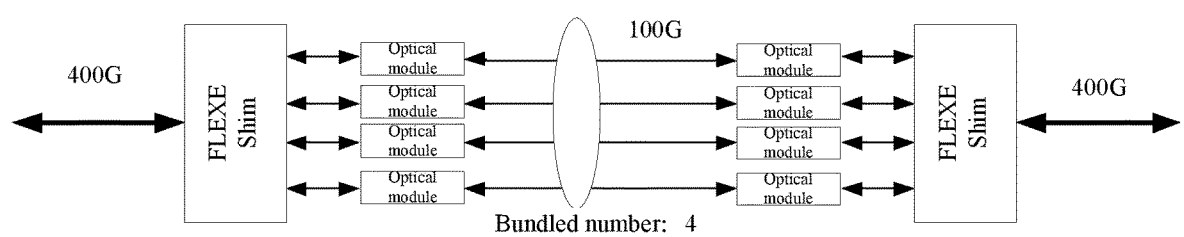
FIG. 1 is a schematic diagram of a FLEXE network structure according to an embodiment of the present disclosure.
Figure 2:
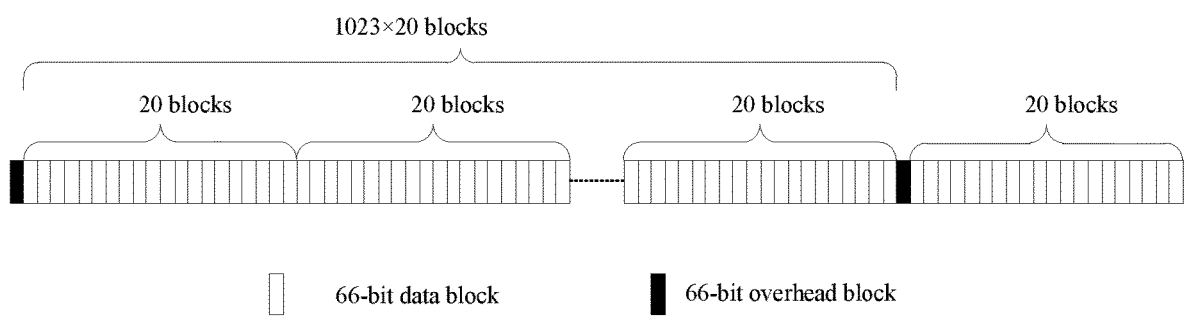
FIG. 2 is a schematic diagram of a coverage range of an overhead block according to an embodiment of the present disclosure.

The FLEXE protocol is located in a block conversion layer in which the 64-bit data is converted to the 66-bit data blocks. Before the 66-bit data blocks are sent, the sending end sorts and plans the 66-bit data blocks. As shown in FIG. 2, a white block represents a 66-bit data block, and for the 100 G traffic, every twenty 66-bit data blocks are grouped into one data block group, the twenty 66-bit data blocks included in each data block group represent twenty time slots, and each time slot represents a traffic speed of the 5 G bandwidth. When the sending end sends the 66-bit data blocks, one FLEXE overhead block is inserted each time when 1023 data block groups, that is, 1023×20 data blocks, are sent, as shown in FIG. 2. After the FLEXE overhead block is inserted, the sending end continues to send data blocks. After the second 1023×20 data blocks are sent, one FLEXE overhead block is inserted again. The data length of the FLEXE overhead block is also 66 bits. In this way, the FLEXE overhead blocks are periodically inserted during the process of sending the data blocks, and the interval between two adjacent FLEXE overhead blocks is 1023×20 data blocks.

When four ways of 100 G physical layers are bundled into a logical traffic of 400 G bandwidth, as shown in FIG. 3, a data block group is still formed by twenty data blocks in each physical layer, and one overhead byte is inserted every 1023 data block groups. In the shim layer of FLEXE, four ways of twenty data blocks are assembled into a data block group formed by 80 data blocks, and 80 time slots exist in the data block group. The customer traffic is delivered in these 80 time slots, the bandwidth of each time slot is 5 G, and thus 400 G bandwidth for traffic delivery is provided.

The FLEXE overhead block is 66 bits long. One overhead block is inserted every 1023×20 data blocks when the traffic data flow is sent. The overhead block plays a positioning function throughout the whole traffic flow. When the overhead block is found, the position of the first data block group and the positions of the subsequent data block groups in the traffic are known. The content of the overhead block is shown in FIG. 4. Eight consecutive overhead blocks form an overhead frame. One overhead block is formed by a 2-bit block identifier and 64-bit block content. The block identifier is located in the first two columns, and the block content is located in the next 64 columns. The block identifier of the first overhead block is 10, and the block identifiers of the subsequent 7 overhead blocks are 01 or SS (SS indicating that the content is uncertain). The content of the first overhead block is: 0x4B (8 bits, 4B in hexadecimal), C (1 bit, indicating adjustment control), OMF (1 bit, indicating an overhead frame multiframe), RPF (1 bit, indicating a remote defect), RES (1 bit, a reserved bit), FLEXE group number (20 bits, indicating the number of the bundle group), 0x5 (4 bits, 5 in hexadecimal), and 000000 (28 bits, all being 0). 0x4B and 0x5 are the identifier indication of the first overhead block. Upon reception, when corresponding positions in an overhead block are found to be 0x4B and 0x5, it indicates that the overhead block is the first overhead block in the overhead frame and forms an overhead frame with the subsequent 7 consecutive overhead blocks. In the overhead frame, the reserved part is reserved content and has not been defined, as shown in the diagonal block in FIG. 4. Other byte content in the overhead block such as Client calendar, Manage channel-section, Manage channel-shim to shim, PHY MAP (a physical layer mapping table), PHY number (physical layer member number) and CRC-16 (cyclic redundancy check) are not related the present disclosure and therefore are not described in detail herein.

According to the FLEXE protocol, eight overhead blocks form one frame. As shown in FIG. 4, among the eight overhead blocks, the first overhead block is indicated by two fields 4B (which is hexadecimal and indicated by 0x4B) and 05 (which is hexadecimal and indicated by 0x5). When it is detected that, in an overhead block, the content at the corresponding positions is 4B and 05, it indicates that this overhead block is the first overhead block, and this overhead block and the subsequent seven overhead blocks form one frame. In the first overhead block, the OMF field is a multiframe indication signal, as shown in FIG. 4. OMF is a single-bit value, which is 0 in 16 consecutive frames, then 1 in 16 consecutive frames, then 0 in 16 consecutive frames, and then 1 in 16 consecutive frames, repeated every 32 frames. In this way, one multiframe is composed of 32 frames.

Currently, the rate of the physical layer PHY defined by the FLEXE protocol is 100 G, 20 slots are defined on the 100 G PHY, and the bandwidth of each slot is 5 G. Through a combination of multiple 100 G PHYs, various types of high-rate, such as 200 G, 300 G, and 400 G, customer traffic can be achieved. However, for a 200 G PHY, a 400 G PHY and the like, currently no relevant content is defined, and there is no disclosure of a traffic delivery method on the 200 G PHY and the 400 G PHY, of how to bundle and deliver traffic on multiple 200 G PHYs and 400 G PHYs, and even of a traffic delivery method on mixed PHYs with different rates.

The present disclosure is described below based on the above-mentioned FLEXE network structure example and data transmission method.

Embodiment 1

Figure 5:
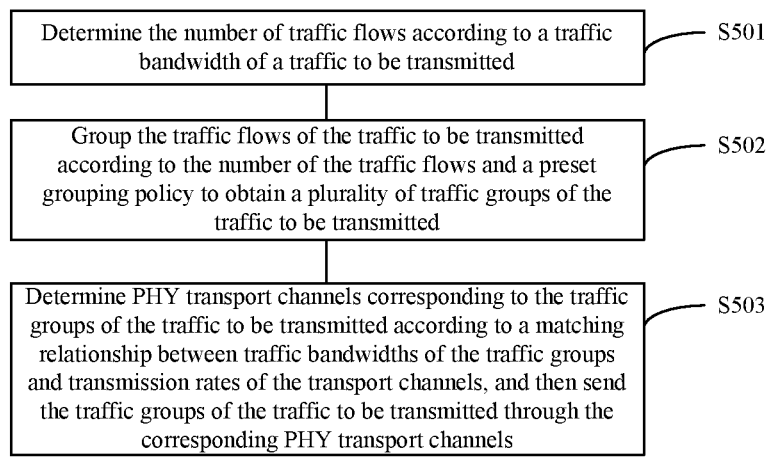
FIG. 5 is a flowchart of a traffic delivery method according to an embodiment of the present disclosure.

Referring to FIG. 5, a traffic delivery method provided by the embodiment is provided. The method may be applied to a sending end of the traffic and include the steps described below.

In S501, the number of traffic flows is determined according to a traffic bandwidth of a traffic to be transmitted.

In S502, the traffic flows of the traffic to be transmitted are grouped according to the number of the traffic flows and a preset grouping policy to obtain a plurality of traffic groups of the traffic to be transmitted.

The number of traffic groups is equal to the number of physical layer (PHY) transport channels.

In S503, PHY transport channels corresponding to the traffic groups of the traffic to be transmitted are determined according to a matching relationship between traffic bandwidths of the traffic groups and transmission rates of the transport channels, and then the traffic groups of the traffic to be transmitted are sent through the corresponding PHY transport channels.

Exemplarily, in S501, the step in which the number of the traffic flows is determined according to the traffic bandwidth of the traffic to be transmitted may specifically include the steps described below.

A multiple the traffic bandwidth of the traffic to be transmitted is a standard bandwidth is obtained.

The multiple is determined as the number of the traffic flows of the traffic to be transmitted. In the embodiment of the present disclosure, a standard bandwidth of 100 G is taken as an example. In response to determining that the traffic bandwidth of the traffic to be transmitted is n×100 G and n is the multiple, the number of traffic flows to be transmitted is n. For example, in response to determining that the traffic bandwidth of the traffic to be transmitted is 400 G, the number of traffic flows is four, and in response to determining that the traffic bandwidth of the traffic to be transmitted is 800 G, the number of traffic flows is eight.

Exemplarily, in S502, the step in which the traffic flows of the traffic to be transmitted are grouped according to the number of the traffic flows and the preset grouping policy to obtain the traffic groups of the traffic to be transmitted specifically include a step described below.

The traffic flows of the traffic to be transmitted are divided into the traffic groups according to the number of the traffic flows to be transmitted, the number of the PHY transport channels, and the rates of the PHY transport channels.

It should be noted that the preset grouping policy needs to combine the two factors of the number of PHY the transport channels and the rates of the PHY transport channels, so that the traffic groups obtained by grouping the traffic flows can be matched with the PHY transport channels corresponding to the traffic groups.

For example, in response to determining that the traffic bandwidth of the traffic to be transmitted is 400 G, the number of traffic flows may be known to be four, and the PHY transport channels are set to be two 200 G PHY transport channels. Then with the number of traffic flows, the number of PHY transport channels and the rate of the PHY transport channels, it may be known that the traffic to be transmitted may be divided into two traffic groups, and each traffic group includes two 100 G traffic flows.

For another example, in response to determining that the traffic bandwidth of the traffic to be transmitted is 400 G, the number of traffic flows may be known to be four, and the PHY transport channels are set to be one 200 G PHY transport channel and two 100 G PHY transport channels. Then with the number of traffic flows, the number of PHY transport channels and the rates of the PHY transport channels, it may be known that the traffic to be transmitted may be divided into three traffic groups. Two traffic groups each include a 100 G traffic flow and another traffic group includes two 100 G traffic flows.

In an implementation mode, in response to determining that the number of traffic flows in one of the traffic groups is greater than 1, the method further includes a step described below. Interpolation on the traffic flows of the traffic to be transmitted in the one of the traffic groups is performed according to a preset interpolation policy to obtain interpolated traffic flows. A bandwidth of the interpolated traffic flows matches a transmission rate of a PHY transport channel corresponding to the one of the traffic groups.

Accordingly, in S503, the step in which the traffic groups of the traffic to be transmitted are sent through the corresponding PHY transport channels specifically includes a step described below. The interpolated traffic flows are sent through the PHY transport channel corresponding to the one of the traffic groups.

Specifically, "matching" in the above refers to that the bandwidth of the interpolated traffic flows is the same as the transmission rate of the PHY transport channel corresponding to the one of the traffic groups. For example, the number of traffic flows is set to be four, the traffic bandwidth of each traffic flow is set to be 100 G, the number of PHY transport channels is set to be two, and the rate of each PHY transport channel is set to be 200 G, two traffic flows may form a traffic group, so that the total bandwidth of the traffic flows in each traffic group is 200 G, which matches the rate of the PHY transport channels. In addition, the number of traffic flows is set to be four, the traffic bandwidth of each traffic flow is set to be 100 G, the number of PHY transport channels is set to be three, and the rate of a PHY transport channel 1 is set to be 100 G, the rate of a PHY transport channel 2 is set to be 200 G, and the rate of a PHY transport channel 3 is set to be 100 G, a traffic flow 1 may be separately divided into a traffic group 1, a traffic flow 2 and a traffic flow 3 may be divided into a traffic group 2, and a traffic flow 4 may be separately divided into a traffic group 3, so that the total bandwidth of the traffic flow in the traffic group 1 matches the rate of the PHY transport channel 1, the total bandwidth of the traffic flows in the traffic group 2 matches the rate of the PHY transport channel 2, and the total bandwidth of the traffic flow in the traffic group 3 matches the rate of the PHY transport channel 3.

It should also be noted that in response to determining that the number of traffic flows in the traffic group is 1, since only one traffic flow is included in the traffic group, the traffic flow may be transmitted through a 100 G PHY transport channel, so there is no need to perform interpolation on the traffic flow to match the rate of the PHY transport channel.

Specifically, the preset interpolation policy at least includes one of: interpolating in units of bits, interpolating in units of 66-bit blocks, or interpolating in units of 20-slot blocks.

For example, in a specific interpolating process, the alignment relationship between each traffic flow in the traffic group does not need to be considered, only the polling interleaving needs be performed on all the traffic flows in the traffic group, and the alignment of specific traffic flows may be achieved by the receiving end.

The embodiment provides a traffic delivery method applied to a traffic sending end. The traffic flows of the traffic to be transmitted are determined according to a standard bandwidth, are grouped according to the number of PHY transport channels and the transmission rates, and are carried and sent on the PHY transport channels. Therefore, traffic can be delivered on a physical channel whose rate is an integer multiple of 100 G, such as a 200 G or 400 G physical layer, and traffic can be delivered on mixed physical layers with different rates.

Embodiment 2

Figure 6:
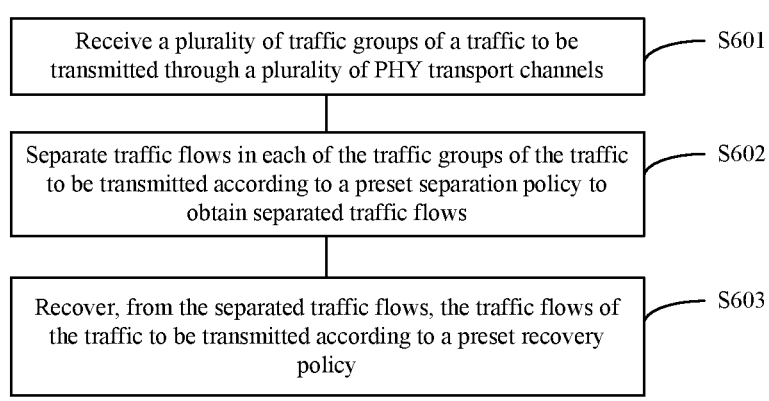
FIG. 6 is a flowchart of another traffic delivery method according to an embodiment of the present disclosure.

Based on the same technical concept described in the foregoing embodiment, referring to FIG. 6, another traffic delivery method provided by the embodiment of the present disclosure is shown. The method may be applied to the traffic receiving end and include the steps described below.

In S601, a plurality of traffic groups of a traffic to be transmitted are received through a plurality of PHY transport channels.

The traffic groups are obtained by a sending end grouping a plurality of traffic flows of the traffic to be transmitted according to the number of the traffic flows and a preset grouping policy. Specifically, the traffic flows of the traffic to be transmitted may be grouped with reference to the foregoing embodiment for implementation, and details are not repeated here.

In S602, traffic flows in each of the traffic groups of the traffic to be transmitted are separated according to a preset separation policy to obtain separated traffic flows.

The preset separation policy is an inverse process corresponding to the grouping policy. It should be noted that the process of separating the traffic flows in the traffic group may be an inverse process of the process of grouping the traffic flows. For example, in response to determining that the sending end groups the traffic flow A and the traffic flow B into the traffic group C, the receiving end may separate the traffic flow A and the traffic flow B from the traffic group C according to the inverse process of the grouping process of the traffic flow A and the traffic flow B.

In S603, the traffic flows of the traffic to be transmitted are recovered from the separated traffic flows according to a preset recovery policy.

Exemplarily, in S602, the step in which traffic flows in each of the traffic groups of the traffic to be transmitted are separated according to a preset separation policy to obtain separated traffic flows specifically include a step described below.

The traffic flows in each of the traffic groups are separated according to a separation policy corresponding to a preset interpolation policy in response to determining that a bandwidth of the traffic group carried by a PHY transport channel corresponding to the each of the traffic groups of the traffic to be transmitted is N times a standard bandwidth. N is greater than 1.

In the embodiment, corresponding to the above embodiment, the standard bandwidth is 100 G. Therefore, in response to determining that the bandwidth of the traffic group carried by the PHY transport channel is N×100, it may be known that the number of traffic flows in the traffic group is greater than one, so the traffic flows in the traffic group need to be separated to obtain N traffic flows. In addition, the preset interpolation policy described in the embodiment may be the same as the interpolation policy used when the sending end performs interpolation in the above embodiment. Therefore, in a specific separation process, separation may also be performed according to the separation policy in a polling manner. Specifically, the separation policy at least includes one of: separation in units of bits, separation in units of 66-bit blocks, or separation in units of 20-slot blocks.

It should be noted that in response to determining that the bandwidth of the traffic group carried by the PHY transport channel corresponding to the traffic group of the traffic to be transmitted is twice the standard bandwidth, it may be known that only one traffic flow is included in the traffic group, so that no separation is needed.

Exemplarily, in S603, the step in which the traffic flows of the traffic to be transmitted are recovered from the separated traffic flows according to a preset recovery policy specifically includes a step described below.

Each of the separated traffic flows is recovered according to a FLEXE protocol to obtain the traffic flows of the traffic to be transmitted.

In the specific implementation process, the step in which each of the separated traffic flows is recovered according to a FLEXE protocol may include: performing frame processing, sorting processing, and alignment processing in sequence on each of the separated traffic flows. It should be noted that the frame processing refers to determining the frame header by querying the overhead block position of the FLEXE in the traffic flow; the sorting processing refers to determining the sequence of each traffic flow of the traffic to be transmitted; and the alignment processing refers to aligning the content of all traffic flows in units of frame headers.

The embodiment provides a traffic delivery method applied to a traffic receiving end. The traffic flows in the traffic group are separated at a transmission rate corresponding to the PHY transport channel, and after the separated traffic flows are recovered, the traffic to be transmitted sent by the sending end is obtained. Therefore, traffic can be delivered on a physical channel whose rate is an integer multiple of 100 G, such as a 200 G or 400 G physical layer, and traffic can be delivered on mixed physical layers with different rates.

Embodiment 3

Based on the same technical concept, the above-mentioned embodiments are further described through specific embodiments.

Specific Embodiment 1

Figure 7:
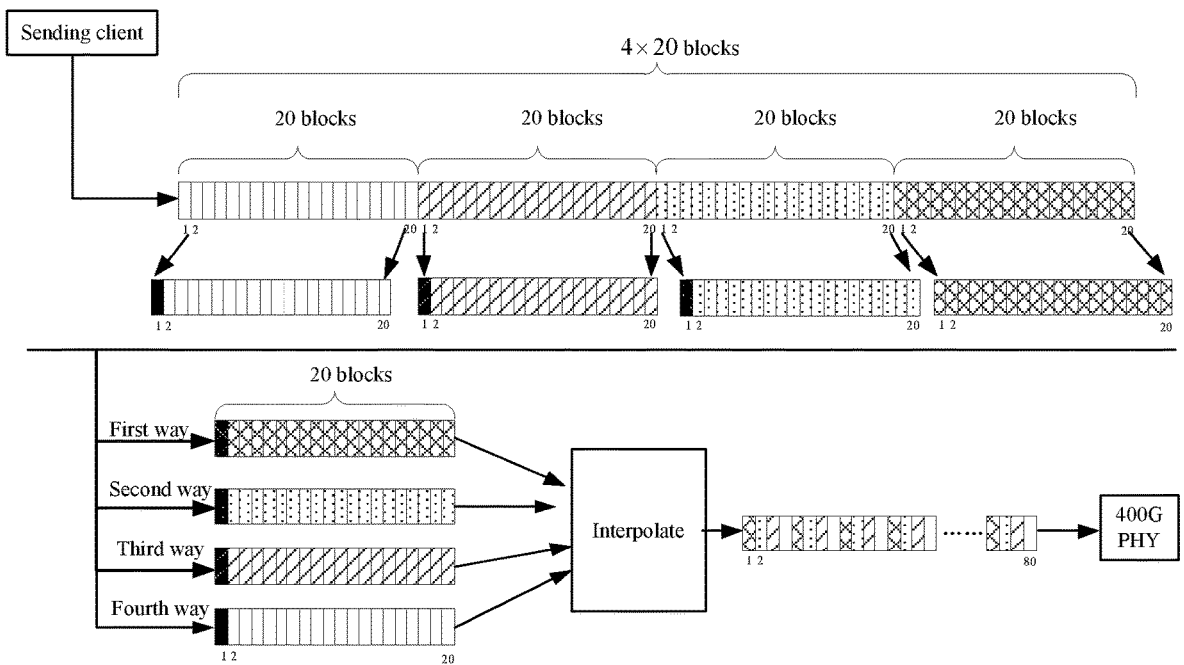
FIG. 7 is a flowchart of a specific process of traffic delivery at a sending end according to an embodiment of the present disclosure.

In the embodiment, the rate of the PHY transport channel is 400 G, and the bandwidth of the traffic to be transmitted is 400 G. Therefore, as shown in FIG. 7, the sending end may carry the traffic to be transmitted in 80 slots according to the 4×100 G shim structure, and the 80 slots are divided into four groups with 20 slots in each group. Next, the FLEXE frame encapsulation is completed according to the carrying mode of four 100 G PHYs to form four ways of FLEXE traffic flows, and the bandwidth of each way of traffic flow is 100 G. Then, interpolation is performed on the four ways of FLEXE traffic flows in a polling manner, and specifically in units of bits, or in units of 66-bit blocks, or in units of 20 slots. Details are not repeated in the embodiment. The alignment relationship between each traffic flow does not need to be considered during the interpolation process, and only interpolation in the polling manner is needed. Therefore, four FLEXE traffic flows can be grouped into a traffic group which has a bandwidth of 400 G, and the traffic group is carried on the 400 G PHY transport channel for transmission.

Figure 8:
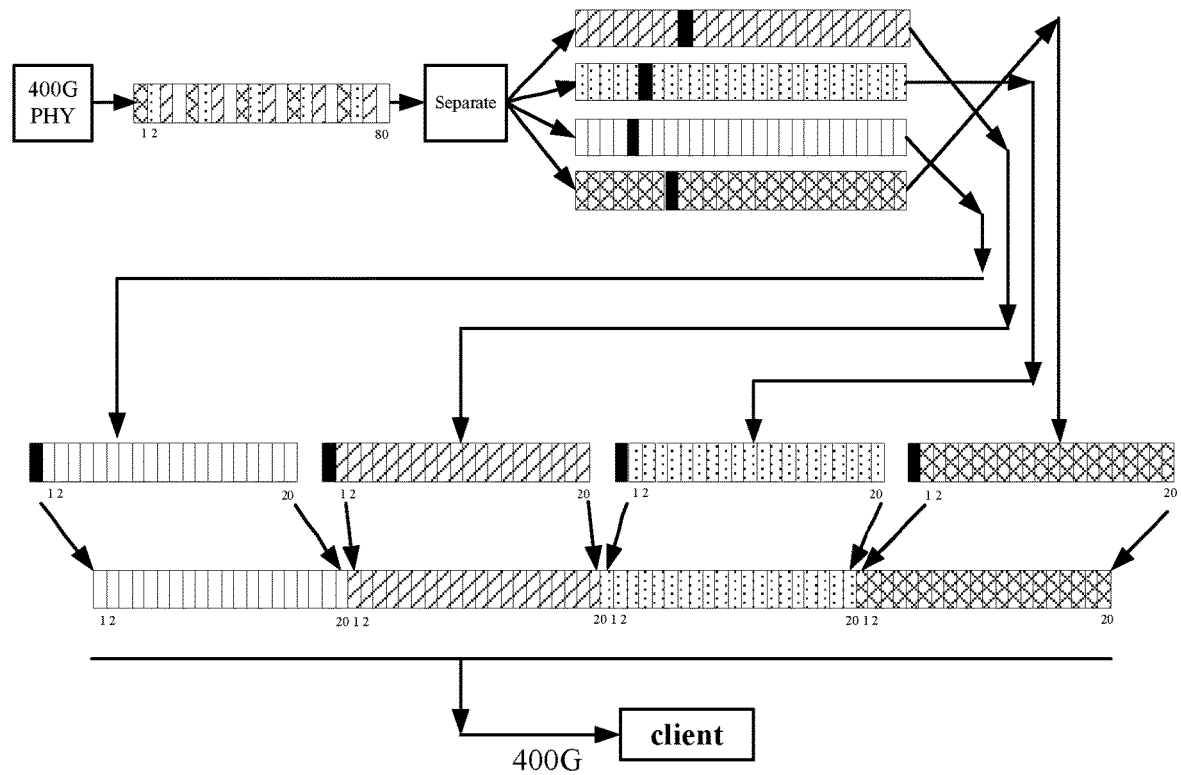
FIG. 8 is a flowchart of a specific process of traffic delivery at a receiving end according to the embodiment of the present disclosure.

At the receiving end, as shown in FIG. 8, a 400 G traffic group is received on the 400 G PHY transport channel, and is separated according to the inverse process of the interpolation manner shown in FIG. 7. The traffic group may be separated in the polling manner. Specifically, the separation may be performed in units of bits, or in units of 66-bit blocks, or in units of 20 time slots. It should be noted that the separation mode at the receiving end only needs to be consistent with the interpolation manner at the sending end. Four ways of traffic flows may be obtained through separation. These four ways of traffic flows may be regarded as four fiber-transported traffic flows in the 4×100 G mode under the FLEXE protocol. Each way of traffic flow is separately FLEXE-framed, -sorted, and -aligned to form a shim layer having 80 time slots, so that the receiving end may directly obtain 400 G traffic to be transmitted from the shim layer.

Specific Embodiment 2

Figure 9:
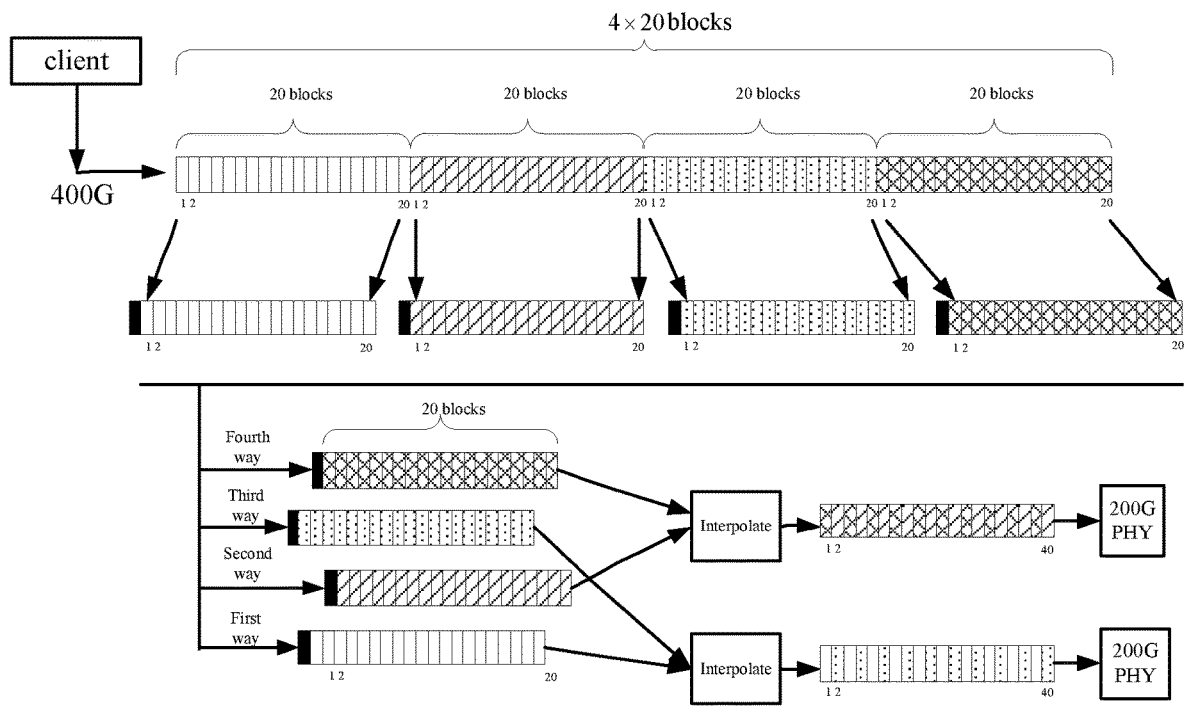
FIG. 9 is a flowchart of another specific process of traffic delivery at a sending end according to an embodiment of the present disclosure.

In the embodiment, the PHY transport channels are two 200 G PHYs, and the bandwidth of the traffic to be transmitted is 400 G. Therefore, as shown in FIG. 9, the sending end may carry the traffic to be transmitted in 80 slots according to the 4×100 G shim structure, and the 80 slots are divided into four groups with 20 slots in each group. Next, the FLEXE frame encapsulation is completed according to the carrying mode of four 100 G PHYs to form four ways of FLEXE traffic flows, and the bandwidth of each way of traffic flow is 100 G. Subsequently, the four ways of FLEXE traffic flows are arbitrarily divided into two traffic groups with two traffic flows in each group. Interpolation is performed on each traffic group in the polling manner. Interpolation is performed on the two ways of 100 G traffic flows to form a traffic group with a bandwidth of 200 G, and the traffic group is carried on two 200 G PHY transport channels for transmission.

Figure 10:
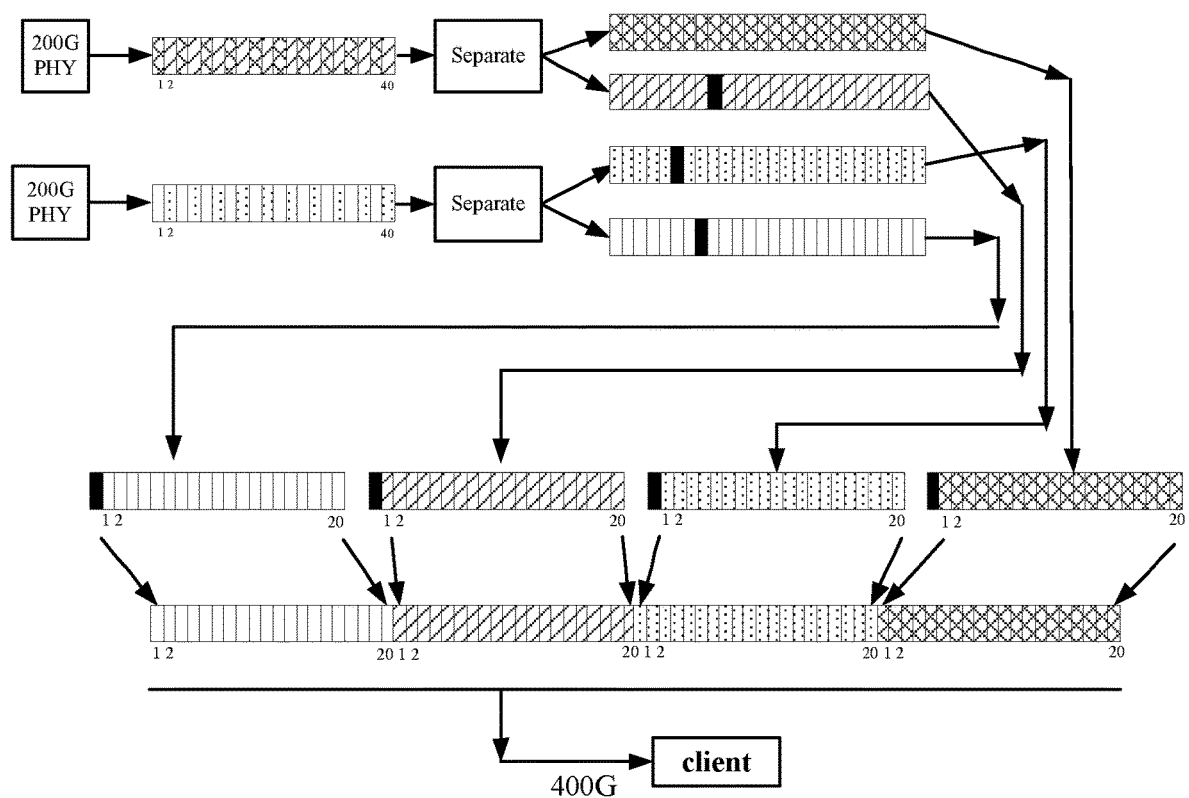
FIG. 10 is a flowchart of another specific process of traffic delivery at a receiving end according to the embodiment of the present disclosure.

At the receiving end, as shown in FIG. 10, a 200 G traffic group is received on each way of 200 G PHY transport channel, and is separated according to the inverse process of the interpolation manner shown in FIG. 9. The traffic group may be separated in the polling manner. It should be noted that the separation mode at the receiving end only needs to be consistent with the interpolation manner at the sending end. Through separation, two ways of traffic flows can be separated from each PHY transport channel, and a total of four ways of traffic flows can be separated from two PHY transport channels. The four ways of traffic flows may be regarded as four fiber-transported traffic flows in the 4×100

G mode under the FLEXE protocol. Each way of traffic flow is separately FLEXE-framed, -sorted, and -aligned to form a shim layer having 80 time slots, so that the receiving end may directly obtain 400 G traffic to be transmitted from the shim layer.

Specific Embodiment 3

Figure 11:
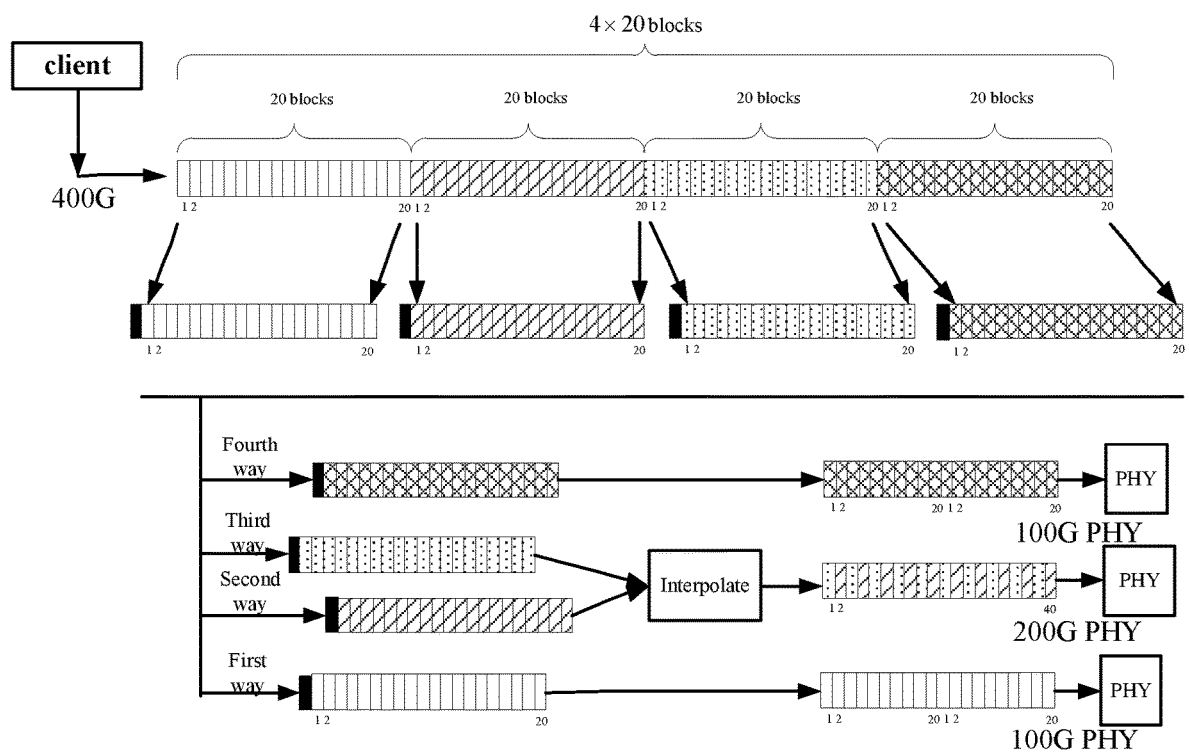
FIG. 11 is a flowchart of yet another specific process of traffic delivery at a sending end according to an embodiment of the present disclosure.

In the embodiment, the PHY transport channels are two 100 G PHYs and one 200 G PHY, and the bandwidth of the traffic to be transmitted is 400 G. Therefore, as shown in FIG. 11, the sending end may carry the traffic to be transmitted in 80 slots according to the 4×100 G shim structure, and the 80 slots are divided into four groups with 20 slots in each group. Next, the FLEXE frame encapsulation is completed according to the carrying mode of four 100 G PHYs to form four ways of FLEXE traffic flows, and the bandwidth of each way of traffic flow is 100 G. Subsequently, the four ways of FLEXE traffic flows are arbitrarily divided into three traffic groups. One group has two 100 G traffic flows, and the other two groups each have only one 100 G traffic flow. Interpolation is performed on the two 100 G traffic flows in a polling manner to form a traffic group with a bandwidth of 200 G. Finally, the sending end carries and transmits the 200 G traffic group through a PHY transport channel with a rate of 200 G, and the other two groups each having one 100 G traffic flow are carried and transmitted through two PHY transport channels with a rate of 100 G.

Figure 12:
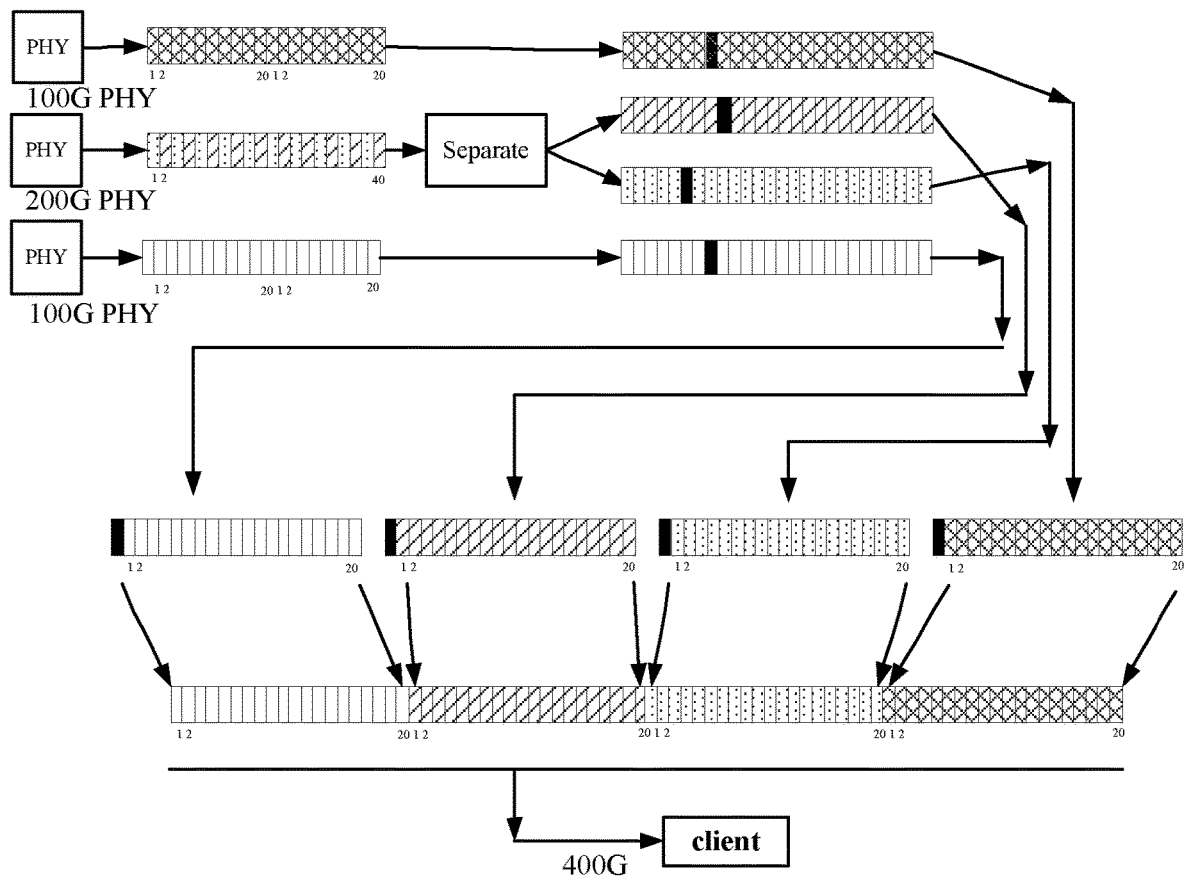
FIG. 12 is a flowchart of yet another specific process of traffic delivery at a receiving end according to the embodiment of the present disclosure.

At the receiving end, as shown in FIG. 12, a 200 G traffic group is received on a 200 G PHY transport channel, and is separated according to the inverse process of the interpolation manner shown in FIG. 11. The traffic group may be separated in the polling manner. It should be noted that the separation mode at the receiving end only needs to be consistent with the interpolation manner at the sending end. Through separation, two ways of traffic flows can be separated from the 200 G PHY transport channel, and one way of traffic flow can be separated from each of the two PHY transport channels with a rate of 100 G. Thus, a total of four ways of traffic flows exist. The four ways of traffic flows may be regarded as four fiber-transported traffic flows in the 4×100 G mode under the FLEXE protocol. Each way of traffic flow is separately FLEXE-framed, -sorted, and -aligned to form a shim layer having 80 time slots, so that the receiving end may directly obtain 400 G traffic to be transmitted from the shim layer.

Embodiment 4

Figure 13:
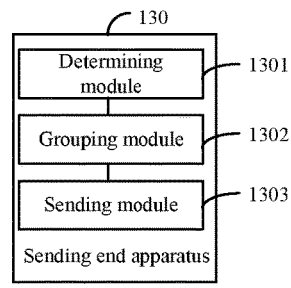
FIG. 13 is a structural diagram of a sending end apparatus according to an embodiment of the present disclosure.

Based on the same technical concept described in the foregoing embodiment, referring to FIG. 13, a sending end apparatus 130 provided by the embodiment of the present disclosure is shown. The sending end apparatus 130 may include a determining module 1301, a grouping module 1302 and a sending module 1303.

The determining module 1301 is configured to determine the number of traffic flows according to a traffic bandwidth of a traffic to be transmitted.

The grouping module 1302 is configured to group the traffic flows of the traffic to be transmitted according to the number of the traffic flows and a preset grouping policy, and obtain traffic groups of the traffic to be transmitted. The number of the traffic groups is equal to the number of PHY transport channels.

The sending module 1303 is configured to determine PHY transport channels corresponding to the traffic groups of the traffic to be transmitted according to a matching relationship between traffic bandwidths of the traffic groups and transmission rates of the transport channels, and then send the traffic groups of the traffic to be transmitted through the corresponding PHY transport channels.

Exemplarily, the determining module 1301 is configured to obtain a multiple the traffic bandwidth of the traffic to be transmitted is a standard bandwidth.

The determining module 1301 is also configured to determine the multiple as the number of the traffic flows of the traffic to be transmitted.

Exemplarily, the grouping module 1302 is configured to divide the traffic flows of the traffic to be transmitted into the traffic groups according to the number of the traffic flows to be transmitted, the number of the PHY transport channels, and the rates of the PHY transport channels.

In an implementation mode, the grouping module 1302 is further configured to perform the step described below.

In response to determining that the number of traffic flows in a traffic group is greater than 1 and according to a preset interpolation policy, interpolation is performed on traffic flows of a traffic to be transmitted in the traffic group to obtain interpolated traffic flows. Bandwidths of the interpolated traffic flows match a rate of a PHY transport channel corresponding to the traffic group.

Accordingly, the sending module 1303 is configured to send the interpolated traffic flows through the PHY transport channel corresponding to the traffic group.

Exemplarily, the preset interpolation policy at least includes one of: interpolating in units of bits, interpolating in units of 66-bit blocks, or interpolating in units of 20-slot blocks.

Additionally, various functional modules in the embodiment may be integrated into one processing unit, or each unit may be separately and physically present, or two or more units may be integrated into one unit. The integrated unit may be implemented by hardware or a software functional module.

The integrated unit of the present disclosure may be stored in a computer-readable storage medium if implemented in the form of a software functional module and sold or used as an independent product. The computer software product is stored in a storage medium and includes several instructions for enabling a computer device (which may be a personal computer, a server or a network device) or a processor to execute all or part of the steps in the method provided by the embodiment. The foregoing storage medium may be a U disk, a mobile hard disk, a read only memory (ROM), a random access memory (RAM), a magnetic disk, an optical disk or another medium that can store program codes.

Specifically, computer-executable instructions (computer program instructions) corresponding to the traffic delivery method in the embodiment may be stored in a storage medium such as an optical disk, a hard disk or a USB flash disk. When the computer program instructions, in the storage medium, corresponding to the traffic delivery method are read or executed by an electronic device, the steps described below are included.

The number of traffic flows is determined according to a traffic bandwidth of a traffic to be transmitted.

The traffic flows of the traffic to be transmitted are grouped according to the number of the traffic flows and a preset grouping policy to obtain a plurality of traffic groups of the traffic to be transmitted. The number of the traffic groups is equal to the number of PHY transport channels.

A PHY transport channel corresponding to each of the traffic groups of the traffic to be transmitted is determined according to a matching relationship between traffic bandwidths of the traffic groups and transmission rates of the PHY transport channels, and the each of the traffic groups of the traffic to be transmitted is sent through the PHY transport channel corresponding to the each of the traffic groups of the traffic to be transmitted.

In an implementation mode, the step stored in the storage medium and in which the number of traffic flows is determined according to a traffic bandwidth of a traffic to be transmitted specifically includes the steps described below.

A multiple the traffic bandwidth of the traffic to be transmitted is a standard bandwidth is obtained.

The multiple is determined as the number of the traffic flows of the traffic to be transmitted.

In an implementation mode, the step stored in the storage medium and in which the traffic flows of the traffic to be transmitted are grouped according to the number of the traffic flows and the preset grouping policy to obtain the traffic groups of the traffic to be transmitted specifically include a step described below.

The traffic flows of the traffic to be transmitted are divided into the traffic groups according to the number of the traffic flows to be transmitted, the number of the PHY transport channels, and the rates of the PHY transport channels.

In an implementation mode, the step stored in the storage medium may further include a step described below in response to determining that the number of traffic flows in a traffic group is greater than 1. According to a preset interpolation policy, interpolation is performed on traffic flows of a traffic to be transmitted in the traffic group to obtain interpolated traffic flows. Bandwidths of the interpolated traffic flows match a rate of a PHY transport channel corresponding to the traffic group.

Accordingly, the step stored in the storage medium in which the traffic groups of the traffic to be transmitted are sent through the corresponding PHY transport channels specifically includes a step described below.

The interpolated traffic flows are sent through the PHY transport channel corresponding to the one of the traffic groups.

In an implementation mode, in a step stored in the storage medium, the preset interpolation policy at least includes one of: interpolation in units of bits, interpolation in units of 66-bit blocks, or interpolation in units of 20-slot blocks.

Embodiment 5

Figure 14:
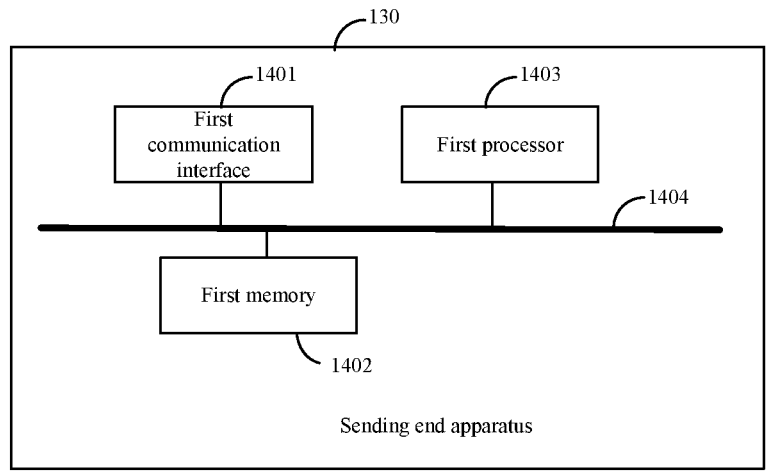
FIG. 14 is a structural diagram of hardware of a sending end apparatus according to an embodiment of the present disclosure.

Based on the same technical concept described in the foregoing embodiment, referring to FIG. 14, a hardware implementation structure of a sending end apparatus 130 provided by an embodiment of the present disclosure is shown. The structure may include: a first communication interface 1401, a first memory 1402, a first processor 1403 and a first bus 1404.

The first bus 1404 is used for connecting the first communication interface 1401, the first processor 1403 and the first memory 1402, and for intercommunication among the devices.

The first communication interface 1401 is configured to perform data transmission with an external network element.

The first memory 1402 is configured to store instructions and data.

The first processor 1403 is configured to execute the instructions used for determining the number of the traffic flows according to a traffic bandwidth of a traffic to be transmitted.

The traffic flows of the traffic to be transmitted are grouped according to the number of the traffic flows and a preset grouping policy to obtain a plurality of traffic groups of the traffic to be transmitted. The number of the traffic groups is equal to the number of PHY transport channels.

A PHY transport channel corresponding to each of the traffic groups of the traffic to be transmitted is determined according to a matching relationship between traffic bandwidths of the traffic groups and transmission rates of the PHY transport channels, and the first communication interface 1401 is instructed to send the each of the traffic groups of the traffic to be transmitted through the PHY transport channel corresponding to the each of the traffic groups of the traffic to be transmitted.

In practical applications, the first memory 1402 may be a first volatile memory, such as a first random access memory (RAM); or may be a first non-volatile memory, such as a first read-only memory (ROM), a first flash memory, a hard disk drive (HDD), a solid-state drive (SSD) or a combination of the above memories, and provides instructions and data for the first processor 1403.

The first processor 1403 may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It should be understood that for different apparatuses, the electronic device for implementing functions of the first processor described above may be others, and is not limited herein.

Exemplarily, the first processor 1403 may be specifically configured to obtain a multiple the traffic bandwidth of the traffic to be transmitted is a standard bandwidth.

The first processor 1403 may also be specifically configured to determine the multiple as the number of the traffic flows of the traffic to be transmitted.

Exemplarily, the first processor 1403 may be specifically configured to perform the step described below.

The traffic flows of the traffic to be transmitted are divided into the traffic groups according to the number of the traffic flows to be transmitted, the number of the PHY transport channels, and the rates of the PHY transport channels.

In an implementation mode, in response to determining that the number of traffic flows in one of the traffic groups is greater than 1, the first processor 1403 is further configured to perform the step described below.

Interpolation on the traffic flows of the traffic to be transmitted in the one of the traffic groups is performed according to a preset interpolation policy to obtain interpolated traffic flows. A bandwidth of the interpolated traffic flows matches a transmission rate of a PHY transport channel corresponding to the one of the traffic groups.

Accordingly, the first processor 1403 is specifically configured to perform the step described below.

The interpolated traffic flows are sent through the PHY transport channel corresponding to the one of the traffic groups.

In an implementation mode, the preset interpolation policy at least includes one of: interpolating in units of bits, interpolating in units of 66-bit blocks, or interpolating in units of 20-slot blocks.

Embodiment 6

Figure 15:
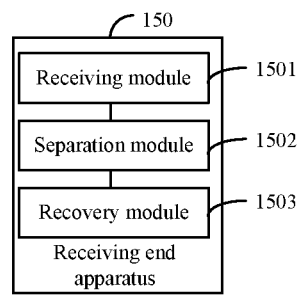
FIG. 15 is a structural diagram of a receiving end apparatus according to an embodiment of the present disclosure.

Based on the same technical concept described in the foregoing embodiment, referring to FIG. 15, a receiving end apparatus 150 provided by the embodiment of the present disclosure is shown. The apparatus may include a receiving module 1501, a separation module 1502 and a recovery module 1503.

The receiving module 1501 is configured to receive a traffic group of a traffic to be transmitted through a PHY transport channel. The traffic group is obtained after a sending end groups traffic flows of the traffic to be transmitted according to the number of the traffic flows and a preset grouping policy.

The separation module 1502 is configured to separate traffic flows in each of the traffic groups of the traffic to be transmitted according to a preset separation policy to obtain separated traffic flows. The preset separation policy is an inverse process corresponding to the grouping policy. The recovery module 1503 is configured to recover, from the separated traffic flows, the traffic flows of the traffic to be transmitted according to a preset recovery policy.

Exemplarily, the separation module 1502 is configured to separate the traffic flows in each of the traffic groups according to a separation policy corresponding to a preset interpolation policy in response to determining that a bandwidth of the traffic group carried by a PHY transport channel corresponding to the each of the traffic groups of the traffic to be transmitted is N times a standard bandwidth. N is greater than 1.

In an implementation mode, the separation policy at least includes one of: separation in units of bits, separation in units of 66-bit blocks, or separation in units of 20-slot blocks.

Exemplarily, the recovery module 1503 is configured to recover each of the separated traffic flows according to a FLEXE protocol to obtain the traffic flows of the traffic to be transmitted.

Additionally, various functional modules in the embodiment may be integrated into one processing unit, or each unit may be separately and physically present, or two or more units may be integrated into one unit. The integrated unit may be implemented by hardware or a software functional module.

The integrated unit of the present disclosure may be stored in a computer-readable storage medium if implemented in the form of a software functional module and sold or used as an independent product. The computer software product is stored in a storage medium and includes several instructions for enabling a computer device (which may be a personal computer, a server or a network device) or a processor to execute all or part of the steps in the method provided by the embodiment. The foregoing storage medium may be a U disk, a mobile hard disk, a read only memory (ROM), a random access memory (RAM), a magnetic disk, an optical disk or another medium that can store program codes.

Specifically, computer-executable instructions (computer program instructions) corresponding to the traffic delivery method in the embodiment may be stored in a storage medium such as an optical disk, a hard disk or a USB flash disk. When the computer program instructions, in the storage medium, corresponding to the traffic delivery method are read or executed by an electronic device, the steps described below are included.

A plurality of traffic groups of a traffic to be transmitted are received through a plurality of PHY transport channels. The traffic groups are obtained by a sending end grouping a plurality of traffic flows of the traffic to be transmitted according to the number of the traffic flows and a preset grouping policy.

Traffic flows in each of the traffic groups of the traffic to be transmitted are separated according to a preset separation policy to obtain separated traffic flows. The preset separation policy is an inverse process corresponding to the grouping policy.

The traffic flows of the traffic to be transmitted are recovered from the separated traffic flows according to a preset recovery policy.

In an implementation mode, the step stored in the storage medium and in which the traffic flows in each of the traffic groups of the traffic to be transmitted are separated according to the preset separation policy to obtain the separated traffic flows specifically includes the step described below.

The traffic flows in each of the traffic groups are separated according to a separation policy corresponding to a preset interpolation policy in response to determining that a bandwidth of the traffic group carried by a PHY transport channel corresponding to the each of the traffic groups of the traffic to be transmitted is N times a standard bandwidth. N is greater than 1.

In an implementation mode, in a step stored in the storage medium, the separation policy at least includes one of: separation in units of bits, separation in units of 66-bit blocks, or separation in units of 20-slot blocks.

In an implementation mode, the step stored in the storage medium and in which the traffic flows of the traffic to be transmitted are recovered from the separated traffic flows according to the preset recovery policy specifically includes the step described below.

Each of the separated traffic flows is recovered according to a FLEXE protocol to obtain the traffic flows of the traffic to be transmitted.

Embodiment 7

Figure 16:
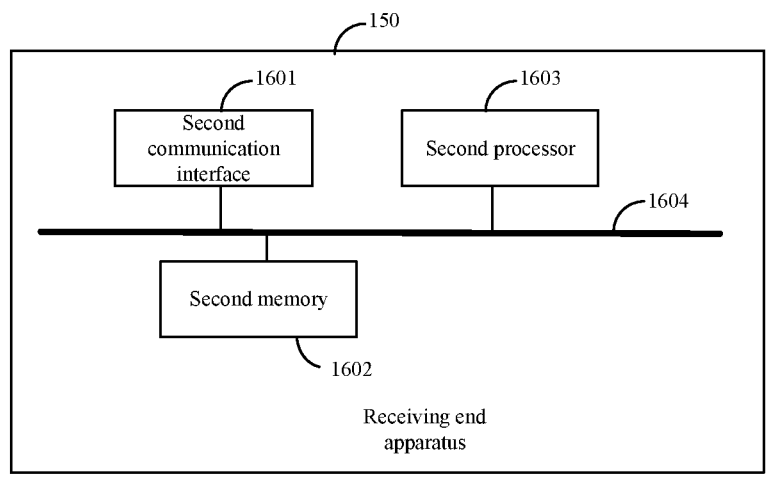
FIG. 16 is a structural diagram of hardware of a receiving end apparatus according to an embodiment of the present disclosure.

Based on the same technical concept described in the foregoing embodiment, referring to FIG. 16, a structural diagram of hardware of a receiving end apparatus 150 provided by the embodiment of the present disclosure is shown. The structure may include: a second communication interface 1601, a second memory 1602, a second processor 1603 and a second bus 1604.

The second bus 1604 is used for connecting the second communication interface 1601, the second processor 1603 and the second memory 1602, and for intercommunication among the devices.

The second communication interface 1601 is configured to perform data transmission with an external network element.

The second memory 1602 is configured to store instructions and data.

The second processor 1603 executes the instructions and is configured to instruct the second communication interface 1601 to receive a traffic group of a traffic to be transmitted through a PHY transport channel. The traffic group is obtained after a sending end groups traffic flows of the traffic to be transmitted according to the number of the traffic flows and the preset grouping policy.

Traffic flows in each of the traffic groups of the traffic to be transmitted are separated according to a preset separation policy to obtain separated traffic flows. The preset separation policy is an inverse process corresponding to the grouping policy.

The traffic flows of the traffic to be transmitted are recovered from the separated traffic flows according to a preset recovery policy.

In practical applications, the second memory 1602 may be a first volatile memory, such as a first random access memory (RAM); or may be a first non-volatile memory, such as a first read-only memory (ROM), a first flash memory, a hard disk drive (HDD), a solid-state drive (SSD) or a combination of the above memories, and provides instructions and data for the second processor 1603.

The second processor 1603 may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It should be understood that for different apparatuses, the electronic device for implementing functions of the first processor described above may be others, and is not limited herein.

Exemplarily, the second processor 1603 is configured to separate the traffic flows in each of the traffic groups according to a separation policy corresponding to a preset interpolation policy in response to determining that a bandwidth of the traffic group carried by a PHY transport channel corresponding to the each of the traffic groups of the traffic to be transmitted is N times a standard bandwidth. N is greater than 1.

In an implementation mode, the separation policy at least includes one of: separation in units of bits, separation in units of 66-bit blocks, or separation in units of 20-slot blocks.

Exemplarily, the second processor 1603 is configured to recover each of the separated traffic flows according to a FLEXE protocol to obtain the traffic flows of the traffic to be transmitted.

Embodiment 8

Figure 17:
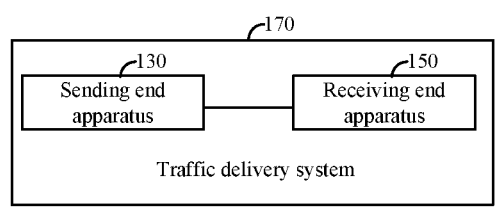
FIG. 17 is a structural diagram of a traffic delivery system according to an embodiment of the present disclosure.

Based on the same technical concept described in the foregoing embodiment, referring to FIG. 17, a traffic delivery system provided by the embodiment of the present disclosure is shown. The system 170 includes the sending end apparatus 130 and the receiving end apparatus 150 according to any embodiment described above.

The sending end apparatus 130 is configured to determine the number of traffic flows according to a traffic bandwidth of a traffic to be transmitted.

The sending end apparatus 130 is also configured to group the traffic flows of the traffic to be transmitted according to the number of the traffic flows and a preset grouping policy to obtain a plurality of traffic groups of the traffic to be transmitted. The number of the traffic groups is equal to the number of PHY transport channels.

The sending end apparatus 130 is also configured to determine a PHY transport channel corresponding to each of the traffic groups of the traffic to be transmitted according to a matching relationship between traffic bandwidths of the traffic groups and transmission rates of the PHY transport channels, and send the each of the traffic groups of the traffic to be transmitted through the PHY transport channel corresponding to the each of the traffic groups of the traffic to be transmitted.

The receiving end apparatus 150 is configured to receive a plurality of traffic groups of a traffic to be transmitted through a plurality of PHY transport channels. The traffic groups are obtained by a sending end grouping a plurality of traffic flows of the traffic to be transmitted according to the number of the traffic flows and the preset grouping policy.

The receiving end apparatus 150 is also configured to separate traffic flows in each of the traffic groups of the traffic to be transmitted according to a preset separation policy to obtain separated traffic flows. The preset separation policy is an inverse process corresponding to the grouping policy.

The receiving end apparatus 150 is also configured to recover, from the separated traffic flows, the traffic flows of the traffic to be transmitted according to a preset recovery policy.

Exemplarily, the sending end apparatus 130 is specifically configured to group the traffic flows of the traffic to be transmitted into the traffic groups according to the number of the traffic flows to be transmitted, the number of the PHY transport channels, and the rates of the PHY transport channels.

In an implementation mode, the sending end apparatus 130 is further configured to: in response to determining that the number of traffic flows in one of the traffic groups is greater than 1, perform interpolation on traffic flows of a traffic to be transmitted in the one of the traffic groups according to a preset interpolation policy, and obtain interpolated traffic flows. Bandwidths of the interpolated traffic flows match a rate of a PHY transport channel corresponding to the one of the traffic groups.

Exemplarily, the receiving end apparatus 150 is configured to separate the traffic flows in each of the traffic groups according to a separation policy corresponding to a preset interpolation policy in response to determining that a bandwidth of the traffic group carried by a PHY transport channel corresponding to the each of the traffic groups of the traffic to be transmitted is N times a standard bandwidth. N is greater than 1.

It should be understood by those skilled in the art that the present disclosure can provide a method, a system or a computer program product. Therefore, the present disclosure may adopt a mode of a hardware embodiment, a software embodiment or a combination of hardware and software embodiments. In addition, the present disclosure may adopt a form of a computer program product implemented on one or more computer-usable storage media (which include, but are not limited to, a disk memory, an optical memory and the like) which include computer-usable program codes.

The present disclosure is described with reference to flowcharts and/or block diagrams of methods, devices (systems) and computer program products according to the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing apparatus to produce a machine so that instructions executed by a computer or the processor of another programmable data processing apparatus produce a device for implementing functions designated in one or more flows in the flowcharts and/or one or more blocks in the block diagrams.

These computer program instructions may also be stored in a computer-readable memory which can direct a computer or another programmable data processing apparatus to operate in a particular manner so that the instructions stored in the computer-readable memory produce a manufactured product including an instructing device. The instructing device implements the functions designated in the one or more flows in the flowcharts and/or the one or more blocks in the block diagrams.

These computer program instructions may also be loaded onto the computer or another programmable data processing apparatus so that a series of operations and steps are performed on the computer or another programmable apparatus to produce processing implemented by the computer. Therefore, instructions executed on the computer or another programmable apparatus provide steps for implementing the functions designated in the one or more flows in the flowcharts and/or the one or more blocks in the block diagrams.

The above are only exemplary embodiments of the present disclosure and are not intended to limit the scope of the present disclosure.

INDUSTRIAL APPLICABILITY

In the embodiments, the traffic flows of the traffic to be transmitted are determined according to a standard bandwidth, are grouped according to the number of PHY transport channels and the transmission rates, and are carried and sent on the PHY transport channels. Therefore, traffic can be delivered on a physical channel with a rate being an integer multiple of 100 G, such as a 200 G or 400 G physical layer, and traffic can be delivered on mixed physical layers with different rates.

What is claimed is:

1. A traffic delivery method, applied to a sending end, comprising:
   determining a number of second traffic flows according to a traffic bandwidth of a first traffic to be transmitted;
   grouping the second traffic flows of the first traffic to be transmitted according to the number of the second traffic flows and a preset grouping policy to obtain a plurality of traffic groups of the first traffic to be transmitted; wherein a number of the traffic groups is equal to a number of physical layer (PHY) transport channels, a total transmission rate of the second traffic flows matches the PHY transport channels; and
   generating a third traffic flow according to the second traffic flows, and sending the third traffic flow through the PHY transport channel corresponding to the third traffic flow.

2. The method of claim 1, wherein determining the number of the second traffic flows according to the traffic bandwidth of the first traffic to be transmitted comprises:
   obtaining a multiple the traffic bandwidth of the first traffic to be transmitted is of a bandwidth of each of the second traffic flow, wherein each of the second traffic flows is a traffic flow of a standard transmission rate; and
   determining the multiple as the number of the second traffic flows corresponding to the first traffic to be transmitted.

3. The method of claim 2, wherein the standard transmission rate is a transmission rate of 100G for a member according to a FlexE protocol.

4. The method of claim 1, wherein grouping the second traffic flows of the first traffic to be transmitted according to the number of the second traffic flows and the preset grouping policy to obtain the traffic groups of the first traffic to be transmitted comprises:
   dividing the second traffic flows of the first traffic to be transmitted into the traffic groups according to the number of the second traffic flows of the first traffic to be transmitted, the number of the PHY transport channels and the transmission rates of the PHY transport channels; and
   generating a third traffic flow for all second traffic flows in each of the traffic groups.

5. The method of claim 4, wherein in response to determining that one of the traffic groups comprises one second traffic flow, the method further comprises:
   determining the second traffic flow to be the third traffic flow of the one of the traffic groups, wherein the second traffic flow is the same as the third traffic flow; and
   in response to determining that the one of the traffic groups comprises more than one second traffic flow, the method further comprises:
   performing interpolation on the second traffic flows of the first traffic to be transmitted in the one of the traffic groups according to a preset interpolation policy to obtain the third traffic flow; wherein a bandwidth of the third traffic flow matches a transmission rate of a PHY transport channel corresponding to the one of the traffic groups;
   wherein sending the each of the traffic groups of the first traffic to be transmitted through the PHY transport channel corresponding to the each of the traffic groups of the first traffic to be transmitted specifically comprises:
   sending the third traffic flow through the PHY transport channel corresponding to the one of the traffic groups.

6. The method of claim 5, wherein in response to determining that the one of the traffic groups comprises two second traffic flows each having a transmission rate of 100G, the interpolation is performed on the two second traffic flows to form the third traffic flow of a transmission rate of 200G; and
   in response to determining that the one of the traffic groups comprises four second traffic flows each having the transmission rate of 100G, the interpolation is performed on the four second traffic flows to form the third traffic flow of a transmission rate of 400G.

7. The method of claim 5, wherein the preset interpolation policy at least comprises one of: interpolation in units of bits, interpolation in units of 66-bit blocks, or interpolation in units of 20-slot blocks.

8. A computer storage medium, storing computer-executable instructions, which is configured to execute the traffic delivery method, applied to the sending end, of claim 1.

9. A sending end apparatus, comprising:
   a processor; and
   a memory for storing instructions executable by the processor,
   wherein the processor is configured to:
   determine a number of second traffic flows according to a traffic bandwidth of a first traffic to be transmitted;
   group the second traffic flows of the first traffic to be transmitted according to the number of the second traffic flows and a preset grouping policy to obtain a plurality of traffic groups of the first traffic to be transmitted; wherein a number of the traffic groups is equal to a number of physical layer (PHY) transport channels, a total transmission rate of the second traffic flows matches the PHY transport channels; and
   generate a third traffic flow according to the second traffic flows, and send the third traffic flow through the PHY transport channel corresponding to the third traffic flow.

10. The sending end apparatus of claim 9, wherein the processor is configured to obtain a multiple the traffic bandwidth of the first traffic to be transmitted is of a bandwidth of each of the second traffic flow, wherein each of the second traffic flows is a traffic flow of a standard transmission rate; and determine the multiple as the number of the second traffic flows corresponding to the first traffic to be transmitted.

11. The sending end apparatus of claim 9, wherein the processor is configured to:

divide the second traffic flows of the first traffic to be transmitted into the second traffic groups according to the number of the second traffic flows of the first traffic to be transmitted, the number of the PHY transport channels, and the transmission rates of the PHY transport channels; and generate a third traffic flow for all second traffic flows in each of the traffic groups.

12. The sending end apparatus of claim 11, wherein the processor is further configured to:

in response to determining that one of the traffic groups comprises one second traffic flow, determine the second traffic flow to be the third traffic flow of the one of the traffic groups, wherein the second traffic flow is the same as the third traffic flow; and in response to determining that the one of the traffic groups comprises more than one second traffic flow, perform interpolation on second traffic flows of the first traffic to be transmitted in the one of the traffic groups according to a preset interpolation policy to obtain the third traffic flow; wherein a bandwidth of the third traffic flow matches a transmission rate of a PHY transport channel corresponding to the one of the traffic groups;

wherein the processor is specifically configured to send the third traffic flow through the PHY transport channel corresponding to the one of the traffic groups.

13. The sending end apparatus of claim 12, wherein the preset interpolation policy at least comprises one of: interpolation in units of bits, interpolation in units of 66-bit blocks, or interpolation in units of 20-slot blocks.

* * * * *